United States Patent [19]

Kempter et al.

[11] Patent Number: 4,731,430
[45] Date of Patent: Mar. 15, 1988

[54] MODIFIED PHENOL RESOLE ETHER RESINS AND THEIR PREPARATION

[75] Inventors: Fritz E. Kempter, Mannheim; Juergen Nieberle, Wachenheim, both of Fed. Rep. of Germany

[73] Assignee: BASF Aktiengesellschaft, Ludwigshafen, Fed. Rep. of Germany

[21] Appl. No.: 883,691

[22] Filed: Jul. 9, 1986

[30] Foreign Application Priority Data

Jul. 13, 1985 [DE] Fed. Rep. of Germany ....... 3525073

[51] Int. Cl.$^4$ .................. C08G 14/08; C08G 8/36
[52] U.S. Cl. ......................... 528/139; 204/181.7; 428/524; 525/495; 525/498; 525/506; 528/140; 528/141; 528/161; 528/162; 528/163; 528/164; 568/660
[58] Field of Search ............... 528/139, 140, 141, 161, 528/162, 163, 164; 525/506, 495, 498; 204/181.7; 568/660; 428/524

[56] References Cited

U.S. PATENT DOCUMENTS

| | | | |
|---|---|---|---|
| 3,485,797 | 12/1969 | Robins | 260/57 |
| 3,616,179 | 10/1971 | McCombs et al. | 528/164 X |
| 3,684,467 | 8/1972 | Smucker et al. | 528/164 X |
| 4,120,847 | 10/1978 | Culbertson | 528/140 |
| 4,122,054 | 10/1978 | Culbertson | 260/29.3 |
| 4,157,324 | 6/1979 | Culbertson | 260/32.8 R |
| 4,184,032 | 1/1980 | Vasishth | 528/139 |
| 4,311,619 | 1/1982 | Seeney et al. | 528/164 X |
| 4,578,448 | 3/1986 | Brode et al. | 528/139 |
| 4,675,375 | 6/1987 | Kempter et al. | 528/140 |

FOREIGN PATENT DOCUMENTS

| | | |
|---|---|---|
| 0002517 | 5/1981 | European Pat. Off. . |
| 3422474 | 12/1985 | Fed. Rep. of Germany . |
| 3422510 | 12/1985 | Fed. Rep. of Germany . |
| 1553036 | 9/1979 | United Kingdom . |

OTHER PUBLICATIONS

U.S. Ser. No. 744,201, filed Jun. 13, 1985.
U.S. Ser. No. 744,204, filed Jun. 13, 1985.

*Primary Examiner*—Howard E. Schain
*Attorney, Agent, or Firm*—Keil & Weinkauf

[57] ABSTRACT

Phenol resins which are modified with compounds possessing amide and/or imide groups and are based on phenol resol ethers bonded via o,o'-methylene ether groups, and a process for their preparation.

The novel modified phenol resol ethers are useful for the preparation of coating systems, in particular as crosslinking agents for cathodic electrocoating binders, and for the preparation of adhesives and rubber assistants.

7 Claims, No Drawings

MODIFIED PHENOL RESOLE ETHER RESINS AND THEIR PREPARATION

The present invention relates to modified phenol resins which are based on phenol resol ethers bonded via o,o'-methylene ether groups and modified with compounds possessing amide and/or imide groups, a process for their preparation, and their use.

Ortho-rich resols are disclosed in, for example, U.S. Pat. No. 3,485,797, the process in question being carried out in a non-aqueous solvent, e.g. benzene, etc.

Ortho-rich resols whose methylol groups are partially etherified with monohydric alcohols are described in U.S. Pat. Nos. 4,120,847, 4,157,324 and 4,122,054.

Processes for the preparation of ortho-rich resols which have low contents of metal ions and phenol and are etherified with alcohols are described in German patent application No. P 34 22 510.2.

It is an object of the present invention to provide modified phenol resol ethers which are bonded via o,o'-methylene ether groups and whose modifier is not an alcohol, i.e. whose methylol groups have not been converted to comparatively sluggishly reactive methylol alkyl ethers, which resol ethers have a long shelf life and good stability during processing coupled with high reactivity.

It is a further object of the present invention to provide a process for the preparation of phenol resins modified in this way and to make it possible to use the products for the production of compression molding materials for electrical insulation, for the preparation of laminates, especially those suitable for electrical insulation, for the production of fiber mats, and preferably for the production of rubber assistants and low-emission cross-linking agents having a low methylol content for surface-coating systems, and for the production of coating materials, in particular cathodic electrocoating binders.

Particularly for the last-mentioned purpose, it is intended to provide products possessing high reactivity and the required stability properties.

We have found that these objects are achieved by phenol resol ethers which are bonded via, o,o'-methylene groups and modified with compounds possessing amide and/or imide groups, and by a process for their preparation which gives essentially phenol-free products having a low content of metal ions.

The present invention relates to modified phenol resins which are based on phenol resol ethers which are bonded via o,o'-methylene ether groups and are obtainable from phenol or an m-alkyl-substituted phenol, if desired mixed with other alkylphenols, and formaldehyde or a formaldehyde donor, in the presence of divalent metal ions, wherein the said phenol resins incorporate compounds possessing amide or imide groups.

Preferred modified phenol resins are those in which the compounds possessing amide and/or imide groups are incorporated via N-methylol groups formed at an intermediate stage.

Monoalkyl or monoalkoxy carbamates and asymmetric dialkylureas are preferred modifiers.

The present invention furthermore relates to a process for the preparation of such modified phenol resins from phenol and/or an m-alkyl-substituted phenol, if desired mixed with other alkylphenols, and formaldehyde or a formaldehyde donor, in the presence of divalent metal ions, and subsequent modification with one or more compounds possessing amide and/or imide groups, wherein A. where the procedure begins with methylolation in an aqueous medium, $a_1$. the methylolation is carried out in the presence of from 0.5 to 10% by weight, based on the phenol used, of divalent metal ions, $a_2$. the divalent metal ions are then removed as a sparingly soluble salt, and $a_3$. the water present as a solvent in the reaction mixture is separated off in the presence of the compound possessing amide or imide groups and in the presence or absence of an entraining agent at from 30° to 80° C., while the water of reaction formed during the modification (incorporation of the compounds possessing amide or imide groups) is separated off at from 40° to 120° C., and B. where the procedure begins with methylolation in a non-polar organic solvent, $b_1$. the methylolation is carried out in the presence of from 0.1 to 0.3% by weight, based on the phenol used, of divalent metal ions, and $b_2$. the modification is effected at from 60° to 120° C. in the presence of one or more compounds possessing amide and/or imide groups, if necessary with recycling of the distillate which passes over, and, finally, the residual amounts of phenol from the preparation of the products according to A. or B. are removed by evaporation in a thin film evaporator, the phenol content being reduced to less than 1% by weight.

Modification can be carried out using compounds which possess amide and/or imide groups and are of the general formula (I)

where R is H or alkyl of 1 to 18 carbon atoms and $R^1$ is alkyl or alkoxy, each of 1 to 18 carbon atoms, hydroxyalkyl of 2 to 4 carbon atoms, oxaalkyl of 3 to 20 carbon atoms or hydroxyoxaalkyl of 4 to 20 carbon atoms, or R and $R^1$ are bonded to one another to form a 5-membered, 6-membered or 7-membered ring, and the NH radical may be flanked by 2 carbonyl groups.

The divalent metal ions are preferably used in the form of carboxylates, preferred carboxylates for the procedure according to A being the formates, acetates and propionates, and preferred carboxylates for the procedure according to B being the naphthenates, octoates and neodecanoates of divalent metals.

The present invention furthermore relates to a process for the preparation of coating systems, in particular cathodic electrocoating finishes, adhesives and rubber assistants, using the novel modified phenol resins.

Regarding the components and individual process steps and the use of the products, the following may be stated specifically.

A. Where the process is carried out in an aqueous medium:

$a_1$. To prepare the novel amide-modified and imide-modified phenol resol ethers bonded via o,o'-methylene ether groups, phenol, if desired as a mixture with an o-substituted or p-substituted $C_1$-$C_{10}$-alkylphenol, or a hydrocarbon resin which contains phenol groups, or phenolic substances modified with polybutadiene oil, for example those described in European Pat. No. 2,517, and, if required, an m-substituted $C_1$-$C_{18}$-alkylphenol, are reacted with formaldehyde in an aqueous system in the presence of a catalyst which directs the reaction to the o-position, for example divalent metal ions, at pH 4-7, preferably pH 4.5-6.0, in general at from 80° to 100° C., until the predominant part of the formaldehyde has reacted. Suitable catalysts are the salts of volatile organic carboxylic acids with divalent electropositive metals, eg. $Zn^{++}$, $Sn^{++}$, $Mg^{++}$, $Ca^{++}$, $Pb^{++}$, $Ba^{++}$ and $Co^{++}$, or, if desired, a mixture of such salts, in an amount of from 0.5 to 10, preferably from 1.3 to 5%, by weight, based on the phenol used, preferably in the form of their carboxylates, such as formates, acetates and propionates. Formates and acetates are particularly preferred.

The molar phenol/formaldehyde ratios to be used are in general from 1:1.0 to 1:2.5, preferably from 1:1.5 to 1:2.2.

The degree of condensation of the products towards the end of this stage of the process corresponds on average to 1-4 phenol units. Higher degrees of condensation generally result in an inhomogeneous aqueous system.

$a_2$. Stage $a_2$ of the process relates to the removal of the amounts of catalyst present in dissolved form, i.e. the divalent metal ions.

$a_{2.1}$. For this purpose, they can be converted to water-insoluble salts, for example phosphates (hydrogen phosphates or ammonium phosphates), sulfates or carbonates. The criterion used in selection is that the virtually insoluble salts must be easy to separate off, for example by filtration. The presence of additives which effect homogenization of the mixture and are removed prior to etherification, e.g. methanol, is sufficient to promote filtration at this point.

The zinc salts, which are particularly suitable for carrying out the process, are preferably removed in the form of hydrogen phosphates.

To prepare the insoluble phosphates, aqueous phosphoric acid is advantageously metered in at from 20° to 70° C., preferably from 40° to 60° C., in the course of about an hour. An excess of unconverted phosphoric acid should be avoided since this may lead to an excessive increase in molecular weight or to crosslinking of the mixture.

$a_{2.2}$. Another, likewise very effective method is the use of $Me^{30}$ + formates or acetates or other salts of divalent metals which are present in solution under the conditions of the methylolation at from 80° to 100° C. but crystallize after cooling and are thus easy to separate off. For example, zinc formate and barium acetate are suitable for this method.

Variant $a_{2.2}$ can be carried out particularly advantageously if the product has a mean molecular weight of from 150 to 250.

$a_3$. This step of the process serves for the removal of the water, i.e. the water present as a solvent and the water of reaction. Water of reaction is understood as meaning water eliminated during the etherification of the methylol groups, and water of reaction from the reaction to effect modification with the compounds possessing amide groups. The degree of etherification of the methylol groups may vary greatly but should be set so that the reactivity of the products is not too high and, if desired, the residual amounts of phenol can be removed easily and as completely as possible in a thin film evaporator. Otherwise, the degree of etherification depends on the intended use of the products. For example, for use as coating materials in cathodic electrocoating, products having a low methylol content are particularly advantageous in some cases. Such products can be prepared by the process according to the invention.

The water is generally separated off in the presence of an entraining agent, such as toluene or cyclohexane, under reduced pressure, preferably initially at from 30° to 50° C., the temperature slowly being increased to 80° C. if necessary. The water of reaction is separated off at from 40° to 120° C., preferably from 40° to 90° C., the pH of the water which passes over decreasing.

As a rule of thumb, it may be stated that the lower the temperatures chosen at the beginning of the distillation, the higher the temperatures can be at which the reaction is completed.

When the etherification reactions are complete, the products generally have a degree of condensation of from 2 to 6, preferably from 3 to 5. The residual phenol content is from 4 to 12, in general from 5 to 7%, by weight, based on the solid resin.

Compounds possessing amide and/or imide groups which are suitable as modifiers are monoamides and diamides, monocarbamates and dicarbamates, monoalkylureas, asymmetric dialkylureas and urea, as well as cyclic compounds which possess one or more amide groups, such as ethyleneurea, propyleneurea, pyrrolidone, oxazolinone or caprolactam, and the cyclic compounds which can be prepared from ureas, formaldehyde and isobutyraldehyde, and compounds which possess imide groups, such as succinimide, phthalimide, etc.

Suitable modifiers are advantageously chosen according to the feasibility of the methylolation reaction at the amidic NH function. Particularly preferred compounds are monocarbamates based on alcohols of 1 to 18 carbon atoms, which may also possess ether groups (polyglycols), monoamides based on carboxylic acids where alkyl is of 1 to 18 carbon atoms, particularly where the alkyl radical is branched and furthermore possesses ether groups, as well as asymmetric dialkylureas in which alkyl is preferably of 1 to 9 carbon atoms.

B. Where the process is carried out in a nonpolar organic solvent:

$b_1$. The methylolation is effected in the presence of from 0.1 to 0.3% by weight, based on the phenol used, of divalent metal ions, selected from the divalent metals stated under $a_1$, for example in the form of their caproates, preferably in the form of their naphthenates, octoates or neodecanoates.

$b_2$. The modification is carried out in the presence of one or more of the compounds possessing amide and/or imide groups and mentioned under $a_3$, advantageously with recycling of the distillate, at from 60° to 120° C., preferably from 60° to 90° C.

Removal of the catalyst is not envisaged in this version of the process (procedure in which the medium has a low water content or is anhydrous).

To reduce or remove the residual amounts of phenol, the products obtained after the modification procedure (stage $a_3$ or $b_2$ of the process) can be brought to a phenol content of <1% by weight in a thin film evaporator, in general at from 80° to 130° C., preferably under reduced pressure.

The pressure is advantageously chosen to be from 1 to 25 mbar.

For some applications, particularly in the coating sector, it is advantageous to provide products having a particularly low residual phenol content; in these cases, products having phenol contents of from 0.01 to 0.5%, based on the solid resin, can be prepared.

To do this, the resin solutions concentrated to a solids content of from 50 to 85%, preferably from 60 to 80%, are preferably used.

Provided that this resin solution contains a sufficient amount of formaldehyde, the amide-containing modifier or modifiers may also be added at this stage in the process, i.e. before the treatment in the thin film evaporator. With suitable temperature control, products having properties similar to those of the products prepared by step $a_3$ or $b_2$ of the process are obtained.

The degree of condensation of the novel products increases further after the treatment in the thin film evaporator. The temperature and residence time can be chosen so that the products have the desired mean molecular weight. Novel products having mean molecular weights of from 300 to 2,000, preferably from 400 to 800, are generally particularly advantageous for use in the intended areas of application.

Suitable thin film evaporators are falling film evaporators (tubular evaporators) and evaporators in which films are produced by mechanical apparatuses, e.g. stirrers with blades (i.e. Sambay ® or Luwa ® evaporators). The evaporator units may also be arranged in series, and concentration of the resol ether can, for example, be carried out in an upstream falling film evaporator.

Process safety during working up of the products in the thin film evaporator can be increased by using the variants proposed in German Patent Application No. P 32 25 072.0.

The products obtained depend on the divalent metal compound employed, for example $Zn^{++}$ giving pale materials, and $Pb^{++}$ dark viscous materials, which have a solids content of from 85 to 97.5%.

Products obtained by version A, where the water of reaction is removed at low temperatures (from 45° to 80° C.), generally have a low ratio of benzyl ether groups to methylol ether groups and a high content of unetherified methylol groups. Products obtained by a procedure in which the water of reaction is removed at higher temperatures (from 80° to 110° C.) possess a higher degree of etherification coupled with a low content of methylol groups and, in some cases, a higher content of methyl groups.

The amounts of modifier to be used depend in general on the content of methylol phenol groups. The molar ratio of the compounds containing amide and/or imide groups to phenolmethylol groups in the condensates prior to the addition of the modifiers is in general chosen to be from 1:1 to 0.1:1, preferably from 0.8:1 to 0.2:1.

In modifiers which contain more than one amide or imide group in the molecule, the ratio of the number of equivalents of these groups to the number of equivalents of methylolphenol groups should not exceed 1:1. Amide or imide groups which are not intended to react with the phenol resol can be etherified with an alcohol after methylolation.

The novel products are used either in the stated highly concentrated form or diluted with a suitable solvent, e.g. an alcohol or ester.

The phenol resol ethers prepared according to the invention can be used, for example, as the sole binder. They are preferably used in combination with other substances suitable for co-crosslinking. Particular examples of these are binders possessing basic N atoms in the molecule, in particular those which have NH groups, baking temperatures of 130° C. being reached. Binders which are suitable for use as cathodic electrocoating binders, as described in, for example, German Patent Application No. P 34 22 474.2, and those described in German Laid-Open Application DOS No. 2,737,375, may be mentioned in particular. The presence of an acidic catalyst, such as one of those mentioned for this purpose, may be advantageous for accelerating the crosslinking reaction.

The novel phenol resol ethers which are bonded via o,o'-methylene ether groups and modified with amide or imide groups are also useful as rubber assistants.

The products according to the invention are also useful for the production of compression molding materials, laminates and adhesives and as binders or crosslinking agents for the preparation of electrical insulation materials. The novel ortho-rich resol ethers can also be used to produce aqueous secondary dispersions, which likewise may be advantageously used in some of the stated areas.

In the Examples which follow, parts and percentages are by weight, unless stated otherwise.

EXAMPLE 1

1075.0 parts of phenol, 1886.0 parts of aqueous 0% strength formaldehyde solution and 148.5 parts of zinc acetate ($Zn(CH_3COO)_2.2H_2O$) were slowly heated to 90° C. and kept at this temperature for 3.5 hours.

Thereafter, the mixture was cooled, 200 parts of methanol were added, 146.5 parts of 40% strength o-phosphoric acid were introduced dropwise at 30° C. in the course of one hour, and the solution was filtered off from the crystalline precipitate formed.

300 parts of toluene were added as an entraining agent, after which the clear resin solution was concentrated at 35° C. under reduced pressure in an apparatus provided with effective condensers, by separating off 1,000 parts of distillate (predominantly water); finally, 300 parts of isobutyl carbamate were added, and a further 560 parts of distillate were separated off until an internal temperature of 50° C. was reached.

The resulting resin solution was filtered over a pressure filter, and 8 parts of di-n-butylamine were added. The condensate had a mean molecular weight of 265.

The product was worked up in a two-stage thin film evaporator at from 80° to 110° C. and under 1.0 mbar. 1,365 parts of a pale resin having a mean molecular weight of 285 and a viscosity of 120 mPa.s at 100° C. (measured using an ICI plate-and-cone viscometer) were obtained. The residual phenol content was 0.1% and the zinc content 541 ppm.

EXAMPLE 2

The mixture described in Example 1 was used, and the procedure was carried out as described there. After the zinc phosphate had been removed, the water was separated off in the first step at 35° C., about 1,260 parts of distillate being obtained. Thereafter, 740 parts of isodecyl carbamate (Example 2a) were added, and removal of the water was continued at 40° C. until a further 340 parts of distillate had been separated off.

The resulting resin solution was filtered over a pressure filter, and 4 parts of di-n-butylamine were added.

The condensate had a mean molecular weight of 272.

The product was worked up in a two-stage thin film evaporator at from 70° to 120° C. and under 1.0 mbar.

1,910 parts of a pale resin having a solids content of 92%, a mean molecular weight of 487 and a viscosity of 480 mPa.s at 100° C. were obtained. The residual phenol content was 0.12% and the zinc content 44 ppm.

EXAMPLE 2a 567 parts of isodecanol, 324 parts of urea and 18.9 parts of an ion exchanger doped with Ni++ (Amberlit 200 ®, Ni content 8–9%) were stirred at 160° C. for 20 hours while the vessel was flushed with nitrogen, and the hot mixture was then filtered under suction over a glass suction filter to give 646 parts of a pale liquid which still contained 9% of isodecanol and 1.1% of unconverted urea. In addition to isodecyl carbamate (principal component), the reaction product also consisted of isodecyl allophanate and isodecyl imidocarboxylate [$HN(COO-C_{10}H_{21})_2$].

EXAMPLE 3

800.0 parts of an epoxide/hexamethylenediamine adduct (prepared as described in Example B of German patent application No. P 34 22 473.4), 280 parts of a dimeric fatty acid (eg. Pripol ® 1014 from Unilever AG), 35.0 parts of stearic acid, 18.0 parts of triphenylphosphine, 24 parts of ethylenediamine dissolved in 188.0 parts of phenylglycol, 54 parts of benzyl alcohol and 85.0 parts of toluene were reacted at 170° C., with removal of water, until an acid number of from 3 to 4 mg of KOH/g was reached. The mixture was then diluted with 9.6 parts of 1-methoxypropan-2-ol, 75 parts of butylglycol, 110 parts of ethanol, 135 parts of water and 11.3 parts of acetic acid, and was filtered. The solids content of the binder was 64% and the amine number was 69.5 mg of KOH/g.

To prepare 3,000 parts of a 10% strength electrocoating bath, 328.0 parts of this binder were mixed thoroughly with 115.0 parts of the phenol resin prepared as described in Example 2 and brought to a viscosity of 600 mPa.s at 100° C. (corresponding to a mean molecular weight of 585) by post-condensation at from 95° to 100° C. and then brought to a solids content of 80% in ethanol, and the product was protonated with 5.0 parts of acetic acid, diluted slowly with fully deionized water and finally stirred thoroughly for 2 days at 25° C. The pH was 7.15 and the conductivity of the bath was 1,200 [us]. The coatings deposited at 375 V in the course of 2 minutes on zinc phosphate-coated steel sheets made the cathode (Bonder ® 132 from Metallgesellschaft AG) were each cured for 20 minutes at from 130° to 140° C. The resulting 20 μm thick coatings were virtually completely acetone-resistant, possessed high flexibility and gave corrosion values of from 0.5 to 1 mm after exposure of 20 days in the salt spray test according to DIN 5002. To test the aging behavior of the coating bath, coatings were prepared again after 10 days (pH 7.1, conductivity 1,200 [μS]) under the conditions stated above. The appearance and film thickness (19 μm) were virtually unchanged. After the bath had aged for 500 hours, the pH was 7.05 and the conductivity 1,220 [μS].

We claim:

1. A process for the preparation of a modified phenol resin which is based on phenol resol ethers which are bonded via, o,o'-methylene ether groups and are obtainable from phenol or an m-alkyl-substituted phenol, and formaldehyde or a formaldehyde donor, in the presence of divalent metal ions, and modification with monoalkyl or monoalkoxycarbamate or asymmetric dialkylurea, wherein A. where the procedure begins with methylolation in an aqueous medium,
   $a_1$. the methylolation is carried out in the presence of from 0.5 to 10% by weight, based on the phenol used, of divalent metal ions,
   $a_2$. the divalent metal ions are then removed as sparingly soluble salt, and
   $a_3$. the water present as a solvent in the reaction mixture is separated off in the presence of monoalkyl or monoalkoxycarbamate or asymmetric dialkylurea and in the presence or absence of an entraining agent at from 30° to 80° C., while the water of reaction formed by reaction of the phenol resol ethers ($a_1$) with monoalkyl or monoalkoxy carbamate or asymmetric dialkyllurea is separated off at from 40° to 120° C., and B. where the procedure begins with methylolation in a non-polar organic solvent,
   $b_1$. the methylolation is carried out in the presence of from 0.1 to 0.3% by weight, based on the phenol used, of divalent metal ions, and
   $b_1$. the modification is effected at from 60° to 120° C. in the presence of one or more compounds of monoalkyl or monoalkoxy carbamate or asymmetric dialkylurea, and, finally, the residual amounts of phenol from the preparation of the products according to A. or B. are removed by evaporation in a thin film evaporator, the phenol content being reduced to less than 1% by weight.

2. A process as claimed in claim 1, wherein, in the case of procedure B, the naphthenates, octoates or neodecanoates of divalent metals are used.

3. A process as claimed in claim 1, wherein, in the case of procedure A, the divalent metal ions are separated off as salts of phosphoric acid.

4. The process of claim I, wherein the phenol or an m-alkyl-substituted phenol is mixed with other alkylphenols.

5. The process of claim 1, wherein the distillate in step (2) which passes over is recycled.

6. A cathodic electrocoating finish containing a compound prepared by the process of claim 1 as a crosslinking component.

7. An adhesive or rubber assistant containing a compound prepared by the process of claim 1 as a crosslinking component.

* * * * *